United States Patent Office 2,770,612
Patented Nov. 13, 1956

2,770,612

ELASTOMERIC DIISOCYANATE-MODIFIED POLYESTERS

Charles S. Schollenberger, Cuyahoga Falls, Ohio, assignor to The B. F. Goodrich Company, New York, N. Y., a corporation of New York No Drawing. Application January 23, 1952, Serial No. 267,915

12 Claims. (Cl. 260—75)

This invention relates to synthetic elastomeric polymers of the polyurethane class and to the preparation thereof, more particularly it relates to the condensation of certain polyesters with organic diisocyanates to produce easily-processable gums resembling unvulcanized natural rubber in appearance and consistency; and to the subsequent elasticization, vulcanization or curing of such gums by further reaction with diisocyanates to give elastic rubbery products of remarkable properties.

It is known that linear polyesters containing reactive hydroxyl end groups, such as are obtained by the esterification-condensation of a dicarboxylic acid with an excess of a glycol, may be transformed into higher molecular weight polymers of the polyesterurethane class by reaction of their terminal hydroxyl groups with diisocyanates. However when working with the usual polyesters of molecular weights in the range of 2,500 to 5,000, the products are generally either (a) substantially linear polyesterurethanes which are tough, sharp-melting solids which cold draw and orient readily or (b) cross-linked, three-dimensional elastic materials which are not capable of being processed in the manner of unvulcanized natural rubber.

I have now discovered that polyesterurethanes of an entirely different character, in that they are easily-processable gums resembling unvulcanized natural rubber in appearance and in ability to be processed on conventional rubber machinery, are produced by reaction of a particular kind of hydroxyl polyester, in particular proportions, with a diisocyanate, particularly a phenylene diisocyanate, and that the resulting processable gums may be converted in a subsequent vulcanization of curing step, including further reaction with a diisocyanate, which may desirably be a diiocyanate of lesser volatility than a phenylene diisocyanate, into elastic rubbery products of outstanding physical properties. For example, I am able to prepare in accordance with this invention, polyesterurethane gums which are substantially as easily processable as is natural rubber and which on vulcanization or curing with diisocyanate yield "pure-gum" cured products of a tensile strength of about 9,800 lbs. p. s. i. as compared to 3,500-5,000 lbs. p. s. i. for natural rubber, a hysteresis rise at 212° F. of only about 9° F. as compared to about 21° F. for natural rubber, an abrasion resistance many times that of natural rubber, and in addition, a greatly superior resistance, by reason of the absence of the reactive double bonds as in natural rubber, to oxygen and ozone and various other influences which rapidly degrade natural rubber.

In order to achieve these results it is of critical importance that the starting polyester utilized in the practice of the invention be carefully prepared so as to possess certain hereinafter defined characteristics. The polyester is, of course, prepared by an esterification reaction of an aliphatic dibasic (dicarboxylic) acid or an anhydride thereof with ethylene glycol, the preferred reactants being adipic acid and ethylene glycol. Molar ratios of about 3 moles of glycol to one mole of acid are preferably employed so as to obtain linear chains containing a preponderance of terminal hydroxyl groups. Less glycol, in the range of 1.2 to 3.0 moles to one mole of acid, may be used but the 3 to 1 ratio has been found to be very efficient for this purpose.

The acid, or its anhydride, and ethylene glycol are reacted together by heating at a temperature below about 190° C. for a time and at a temperature substantially equivalent to heating at 185° C. at atmospheric pressure for 4 to 6 hours, then gradually reducing the pressure to 30 to 60 mm. of mercury for 4 to 6 hours and finally for 4 to 10 hours at 1.5 mm. During the heating period substantially all the water of esterification and excess ethylene glycol are removed and this may be facilitated by bubbling nitrogen through the molten mass. It is important that the temperature throughout be kept below 200° C. since temperatures 200° C and above yield polyesters which on reaction with diisocyanates according to this invention give cured polyesterurethanes of much less desirable physical properties. Extended heating times at low pressures are also undesirable for the same reasons.

Esterification under the above conditions gives hydroxyl polyesters of a waxy low-melting nature, having molecular weights of 560 to 1,500, hydroxyl content of 2.5 to 6 percent, hydroxyl numbers of 75 to 200 and acid numbers below 2. By hydroxyl number is meant the number of milligrams of potassium hydroxide equivalent to a gram of polyester. It is a measure of terminal hydroxyl groups and is determined by reacting acetic anhydride in pyridine with the polyester in toluene and titrating the liberated acetic acid with potassium hydroxide. The acid number is the milligrams of potassium hydroxide required to neutralize each gram of polyester. It is determined by direct titration and measures terminal carboxyl groups.

It has been found that the most useful rubbers are prepared from hydroxyl polyethylene adipates which are waxy solids with melting points of 40° to 46° C., molecular weights from 600 to 1,200 hydroxyl numbers from 95 to 185 and percent hydroxyl content of 2.8 to 5.7 percent. Rubber prepared from such polyesters within a narrow range of 3 to 5 percent average hydroxyl content, 99 to 165 hydroxyl number and molecular weights of 675 to 1,100 are those with optimum physical properties and economic utility. The polyester material is preferably kept in an essentially anhydrous condition and contains less than 0.5 percent free ethylene glycol and also less than 0.5 percent water.

The basic polyester utilized includes polyesters prepared from the esterification of such dicarboxylic acids as malonic, succinic, glutaric, adipic, pimelic, sebacic, suberic, azelaic, maleic and the like with ethylene glycol. It is not essential that the acid be used, the acid anhyride may be employed. Mixtures of acids may also be used. Adipic and pimelic acids are preferred.

In the practice of the invention a hydroxyl polyester, as characterized above, is reacted with an organic diisocyanate, thereby producing a lengthening of the polyester chains. By means of this reaction a rubbery easily processable "gum" is produced. This reaction involves the reactive hydrogens of the terminal groups, essentially hydroxyl but possibly a few carboxyl groups, and the isocyanate groups. One diisocyanate thus ties two short chains together through reaction with the terminal groups. The amount and type of organic diisocyanate used are both critical. The molar proportion of diisocyanate to polyester must be equal to or greater than 1 to 1, and is no greater than 1.1 or at most 1.2 to 1 of polyester. A slight excess of the diisocyanate is preferably used to eliminate substantially all of the terminal hydroxyl groups and produce a predominately linear, substantially non-cross linked, rubbery processable polyesterurethane. This is borne out by the lack of gel (cross linked insoluble residues) as shown by dilute solution viscosity tests in nitromethane of the gum so formed. If a large excess of the diisocyanate is used, gel will be formed and can be found. Such formation is not desirable since highly cross-linked polyesterurethanes are not easily processable and in addition when subsequently cured are not equivalent to the cured products of this invention in physical properties.

In the practice of the invention, a preferred procedure is the mixing of 1.04 moles of p-phenylene diisocyanate with 1 mole of hydroxyl polyethylene adipate of molecular weight 600 to 1,200 in a closed internal mixture at 95–105° C. for 30 minutes to one hour, until the diisocyanate has reacted with the polyester as is shown by the change in consistency as a gum is formed. Another useful procedure is to mix the polyester and diisocyanate together for 10 minutes, pour the syrup so formed into open pans and bake at 105° C. for 6–8 hours. The first procedure is faster but requires considerable power for mixing. The resulting product is essentially a linear polyesterurethane. It is a homogeneous rubber-like gum which is elastic and may be readily processed on a two roll rubber mill or other standard rubber processing equipment. This product has good shelf life and does not harden during storage.

Polyesterurethanes prepared from polyesters of molecular weights above 1,500 such as 2,000 or 2,500 harden on storage and the physical properties of such cured materials are inferior to the cured products of this invention.

The preferred molar quantity of the diisocyanate used for each mole of polyester, in the formation of linear polyesterurethane gum, is 1.02 to 1.04 moles, but 1.0 to 1.08 moles may be desirably used. If quantities less than one mole are used, such as 0.8 or 0.9 mole, sticky, viscous polymers that are hard to handle are obtained and the properties of the cured polymer are inferior to the products of this invention. For example, 0.95 mole of para-phenylene diisocyanate reacted with one mole of polyester yields a very soft, sticky gum which on curing does not give optimum physical properties. If quantities greater than 1.08 moles for example, 1.2 moles of diisocyanate are used, there are obtained tough leathery products which, while processable, are of somewhat inferior quality. When 1.1 moles of para-phenylene diisocyanate are used, the polyesterurethanes are rubbery processable gums but they set up on aging.

The preferred organic diisocyanate for the chain lengthening reaction with polyester is a phenylene diisocyanate such as para-phenylene diisocyanate, meta-phenylene diisocyanate or 4,4'-diisocyanato dibenzyl. Other organic diisocyanates which have been found useful include such aromatic diisocyanates as napthylene-1,5-diisocyanate, diphenylmethane-p, p'-diisocyanate, triphenylmethane-p,p'-diisocyanate, meta-toluylene diisocyanate, and mixtures thereof.

As mentioned above, the rubbery processable polyesterurethane gums secured by reaction of diisocyanates with polyesters of the type described, are converted into cured, elastic rubbery products by reaction with additional organic diisocyanates. The reaction between a predominately linear polyesterurethane and a diisocyanate brings about a cross linking of the polyesterurethane chains. The polyesterurethane and diisocyanate may be mixed by placing the polyesterurethane gum on a rubber mill or in an internal mixer of the Banbury type and adding the organic diisocyanate. On thorough mixing, the resulting compounded composition is formed into sheets or in any desired form and cured under pressure at temperatures and times required to give the physical properties desired in the final product, as is normally done by those skilled in the art. The curing may be carried out at temperatures from 225° F. to 310° F. and for times of 15 to 120 minutes. Any of the diisocyanates listed hereinbefore may be utilized to effect the cure.

A diisocyanate with vapor pressure and boiling point higher than that of para-phenylene diisocyanate is desired for practical reasons of convenience and the health of handlers. The higher boiling point diisocyanates such as 4,4'-diphenyl methane diisocyanate, 4,4'-diisocyanato dibenzyl, naphthylene-1,5-diisocyanate and the like may be utilized.

The amount of the diisocyanate used to effect a cure of the polyesterurethane depends on the degree of cure desired. From four to sixteen parts per 100 parts of polyesterurethane may be utilized, with 6 to 12 parts the preferred amount.

The following examples are given to illustrate the practice of my invention and to more clearly demonstrate its embodiments.

EXAMPLE 1

*Preparation of a hydroxyl polyethylene adipate*

Three moles of ethylene glycol and 1 mole of adipic acid are mixed together in a vented container and heated at 185° C. at atmospheric pressure for 4 to 6 hours. A vacuum is then applied and the internal pressure slowly reduced to 30 to 60 mm. of mercury and held at this point for 6 hours, and finally reduced to 1.5 mm. and held there for 4 to 6 hours. The temperature of 185° C. ± 2° is applied during this entire period. The resulting ester, hydroxyl polyethylene adipates are waxy solids on cooling to room temperature, with a melting point of 40–46° C., has molecular weight of 600 to 1,200, hydroxyl contents of 2.8 to 5.7%, a hydroxyl number of 95 to 185, an acid number less than 1 and contains less than 0.5% water and free ethylene glycol. The higher molecular weight material is prepared by longer heating times under vacuum as described before.

EXAMPLE 2

A polyester is prepared by reacting three moles of ethylene glycol with 1 mole of a dibasic acid mixture consisting of .15 mole of maleic acid and .85 mole of adipic acid as described in Example 1. 70 grams of this hydroxyl polyethylene maleate-adipate, having a molecular weight of 1,22, hydroxyl number of 95.6 and an acid number of 4.39 is then mixed with 10.5 grams of p-phenylene diisocyanate in an internal mixer for 30 minutes at 95 to 100° C. This is a molar ratio of 1.05 moles of p-phenylene diisocyanate to 1 mole of polyester. The resulting polyesterurethane is a snappy, rubbery, transparent, amber gum which processes very well on a rubber mill and has exceptional storage stability. When 1.15 moles of para-phenylene diisocyanate are used, an excellent gum with somewhat poorer storage stability is obtained.

EXAMPLE 3

150 grams of hydroxyl polyethylene adipate, polyester of ethylene glycol and adipic acid, having a molecular weight of 668, an acid number less than 1, a hydroxyl content of 5.1 percent and a hydroxyl number of 168 are put into a closed internal mixer equipped with means for temperature control. p-Phenylene diisocyanate in a ratio of 1.05 moles per mole of polyester, 38.5 grams, is then added and the two materials mixed together for 30 minutes at 105° C. The resulting polyesterurethane is withdrawn from the reactor and allowed to cool at room temperature. The reaction product is a soft, snappy, rubbery gum which processes very well in standard rubber equipment. 12.2 parts by weight of p-phenylene diisocyanate are mixed into 100 parts by weight of the polyesterurethane on a two roll rubber mill. The compounded product is then heated in a steam press for 60 minutes at 280° F. The resulting cured rubber has a tensile strength of 8600 pounds p. s. i., a modulus value of 1500 p. s. i. at 300% elongation and an elongation at break of 700%.

A similar polyesterurethane prepared from polyester of 835 molecular weight yielded a tensile strength of 9100 p. s. i. and an elongation of 620%.

EXAMPLE 4

Example 3 is repeated except that the molar ratio of diisocyanate to polyester in the gum formation stage is 1.07 moles of p-phenylene diisocyanate to 1 mole of hydroxyl polyethylene adipate. The cured product in this case has a tensile strength of 9800 pounds per square inch, a 300% modulus of 1500 pounds p. s. i. and an elongation of 785%.

EXAMPLE 5

A hydroxyl polyester adipate is prepared as outlined in Example 1, with a molecular weight of 1085, a hydroxyl number of 103 and a hydroxyl content of 3.1%. The polyester is reacted with 1.05 moles of p-phenylene diisocyanate per 1 mole of polyester and the resulting polyesterurethane product cured with 8 parts of p-phenylene diisocyanate. A tensile strength of 8100 pounds p. s. i., a 300% modulus of 2000 pounds p. s. i. and an elongation of 595% are obtained.

EXAMPLES 6 THROUGH 8

The effect on final physical properties of varying molecular weight polyester used to prepare the polyesterurethane gums is demonstrated below. These samples of hydroxyl polyethylene adipate were prepared, Example 1, and by increasing the heating time of the final evacuation step, polymers of increasing molecular weight were obtained. These products were then reacted with 1.07 moles of p-phenylene diisocyanate per 1.0 mole of polyester in an internal mixer at 105° C. for 30 minutes. 100 parts by weight of the processable polyesterurethane rubbery gums resulting were mixed on a 2 roll rubber mill with 12 parts by weight of para-phenylene diisocyanate. The stress-strain results obtained from tests in a Scott Tensile Tester on samples curved at 280° F. for 60 minutes are given below:

| Molecular weight of Polyester | Tensile Strength, p. s. i. | Elongation, Percent | Modulus, p. s. i., at 300% El. |
| --- | --- | --- | --- |
| 1,580 | 5,500 | 1,150 | 500 |
| 1,073 | 6,200 | 800 | 600 |
| 668 | 9,800 | 785 | 1,500 |

EXAMPLE 9

One mole of hydroxyl polyethylene adipate prepared as outlined in Example 1 with a molecular weight of 845, a hydroxyl number of 128 and a hydroxyl content of 3.88% was reacted with 1.00 mole of naphthylene-1,5-diisocyanate and cured with 8 parts of 1,5-naphthylene-diisocyanate at 290° F. for 60 minutes. The cured polymer was more leathery and less lively than polymer prepared with para-phenylene diisocyanate. A tensile strength of 8240 p. s. i., an elongation of 720%, and a modulus at 300% elongation of 2020 p. s. i. were obtained on the cured stock.

EXAMPLE 10

A polyester was prepared from ethylene glycol and suberic acid following the procedure outlined in Example 1. A polyester with a molecular weight of 1050 was obtained. One mole of this polyester was further reacted with 1.05 moles of para-phenylene diisocyanate for 30 minutes at 100° C. The resulting polyesterurethane was compounded on a rubber mill with 8 parts of para-phenylene diisocyanate to 100 parts of the polyester. The stock was cured at 280° F. for 60 minutes. The following stress-strain results were obtained: a tensile strength of 7300 p. s. i., an elongation of 1300% and a modulus of 720 p. s. i. or 300% elongation. The cured stock was tough and leathery.

EXAMPLE 11

A polyester was prepared from ethylene glycol and succinic acid by the procedure given in Example 1. The polyester had a molecular weight of 1305. One mole of the hydroxyl polyethylene succinate was reacted with 1.05 moles of para-phenylene diisocyanate for 30 minutes at 100° C. The resulting polyesterurethane gum was mixed with 8 parts of para-phenylene diisocyanate on a two roll mill and cured for 60 minutes at 280° F. The cured stock had a tensile strength of 6160 p. s. i., an elongation of 700% and a 300% modulus of 1000 p. s. i. The cured stock had a leathery feel.

EXAMPLE 12

The use of different organic diisocyanates as curing agents is shown in these examples. 1000 parts of hydroxyl polyethylene adipate, prepared as outlined in Example 1 and having an average molecular weight of 1000, are reacted with 165 parts by weight of para-phenylene diisocyanate for 30 minutes at 110° C. Portions of this polyesterurethane gum were mixed on a 2 roll rubber mill with the following indicated parts by weight of a diisocyanate. The samples were cured in a steam press at 307° F. for 60 minutes. These stress-strain results obtained on the cured stock are given in the table.

| Diisocyanate Used For Cure | Parts per 100 Parts of Polymethane | Stress-strain | | |
| --- | --- | --- | --- | --- |
| | | Tensile, p. s. i. | 300% Modulus, p. s. i. | Elongation, percent |
| p-Phenylene Diisocyanate | 8.6 | 6,700 | 400 | 1,140 |
| m-Phenylene Diisocyanate | 8.6 | 6,250 | | 910 |
| Diphenyl Methane p,p'-diisocyanate | 13.5 | 2,900 | 200 | 620 |
| Biphenyl-4,4' diisocyanate | 12.7 | 7,050 | 200 | 930 |
| 2,4 Diisocyanato toluene | 9.4 | 3,800 | | 650 |
| 2,5 Diisocyanato toluene | 9.4 | 3,360 | | 550 |

Some of the unique properties of the rubbery materials of my invention are given in the following example. The extremely good strength of cured gum stocks has already been shown. The linear polyesterurethane gums may be processed like other rubbery materials in standard factory equipment. The gum is amenable to the usual compounding techniques known to the art. Reinforcing agents, fillers, coloring agents, softeners and the like may be added to the gum before, at the same time or after the curing agent is added, but before curing. Since ethylenic unsaturation may be eliminated in the polymer chains, these polymers are not subject to deterioration by oxygen or ozone.

The effect of reinforcing pigments on physical properties of the cured product is given in the following example.

EXAMPLE 13

Hydroxyl polyethylene adipate of average molecular weight of 900 is reacted with 1.05 moles of p-phenylene diisocyanate as outlined in Example 3. This gum is compounded with the following listed reinforcing pigments and the curing agent on a rubber mill. The mixtures are sheeted and samples cured in a steam press at 307° F. for 60 minutes. Stress-strain results obtained from tests run in a Scott Tester are given below:

| Sample No. | Parts p-phenylene diisocyanate per 100 parts of polyester | Reinforcing Pigment | Parts | Tensile Strength, p. si. i | Modulus at 300%, p. s. i. | Elongation, percent |
| --- | --- | --- | --- | --- | --- | --- |
| 1 | none | none | none | 400 | none | 1,200 |
| 2 | 8.6 | do | none | 8,200 | 800 | 775 |
| 3 | 8.6 | Easy Processing Black. | 10 | 5,800 | 1,900 | 500 |
| 4 | 8.6 | do | 20 | 8,600 | 3,200 | 525 |
| 5 | 8.6 | do | 30 | 8,400 | 6,000 | 425 |
| 6 | 8.6 | Calcium Silicate. | 10 | 9,200 | 1,900 | 600 |

It will be noted that the physical properties of the cured product of this invention can be changed by addition of reinforcing pigments. The modulus is particularly affected by the addition of carbon black.

Another novel feature of the cured product is its high resistance to abrasion. A sample of the cured polyesterurethane gum similar to that prepared in Example 5 was placed in the Williams' Abrasion Tester. The loss occurring was 10 cc. per horse power hour. A standard vulcanized natural rubber tread stock has an average loss of 180 to 190 cc. per horsepower hour in the same test.

An extremely useful property of these rubbers is exceptionally low hysteresis or heat build up during deformation.

EXAMPLE 14

The cured gum sample that was prepared with paraphenylene diisocyanate in Example 16 was tested in Goodrich Flexometer for its heat buildup characteristics. The test was made at 212° F., with a 17½% stroke at 55 pounds. The temperature buildup was 9° F. as compared to 21° F. for a natural rubber gum stock. This negligible heat buildup on deformation is of great value in making products which are subjected to continued flexing. The cured gums also exhibit outstanding resistance to hydrocarbon solvents.

Through the use of other dibasic acid/ethylene glycol polyesters as well as other diisocyanates and curing agents useful rubbers of a desired balance of physical properties may be obtained.

Although I have specifically described representative embodiments of the invention, I do not desire or intend that it be limited solely thereto, as it will be apparent to those skilled in the art that modifications and variations may be made without departing from the spirit and scope of the invention as defined in the appended claims.

I claim:

1. The process of producing a rubbery, processable, substantially linear polyesterurethane gum vulcanizable to a tensile strength of greater than 5,000 pounds per square inch which consists essentially of reacting one mole of a linear aliphatic hydroxyl polyester of ethylene glycol and an aliphatic dicarboxylic acid having a molecular weight of 600 to 1,200, a hydroxyl number of 95 to 185, a hydroxyl content of 2.8 to 5.7 percent and an acid number below 2 with 1.02 to no greater than 1.1 moles of an aromatic diisocyanate selected from the class consisting of phenylene diisocyanates and 1,5-naphthylene diisocyanate.

2. The process of producing a rubbery, processable, substantially linear polyesterurethane gum vulcanizable to a tensile strength of substantially greater than 5,000 pounds per square inch which consists essentially of reacting one mole of a linear hydroxyl polyethylene adipate having a molecular weight of 675 to 1,100, a hydroxyl number of 99 to 165, a hydroxyl content of 3 to 5 percent and an acid number below 2 with 1.02 to 1.08 moles of para-phenylene diisocyanate, said polyester prepared by reacting an excess of ethylene glycol with adipic acid and having a melting point of 40 to 46° C.

3. The process of producing a rubbery, processable, substantially linear polyesterurethane gum vulcanizable to a tensile strength of substantially greater than 5,000 pounds per square inch which consists essentially of reacting one mole of linear hydroxyl polyethylene adipate having a molecular weight about 900, a hydroxyl number about 130, a hydroxyl content about 4 percent, less than 0.5% free ethylene glycol and less than 0.5% water and an acid number below 2 with 1.02 to 1.04 moles of para-phenylene diisocyanate, said polyester prepared by reacting an excess of ethylene glycol with adipic acid and having a melting point of 40 to 46° C.

4. The process of producing a rubbery polyesterurethane vulcanizate having a tensile strength of greater than 5,000 pounds per square inch which consists essentially of reacting one mole of a linear aliphatic hydroxyl polyester of ethylene glycol and an aliphatic dicarboxylic acid having a molecular weight of 600 to 1,200, a hydroxyl number of 95 to 185, a hydroxyl content of 2.8 to 5.7 percent and an acid number below 2 with 1.02 to no greater than 1.1 moles of an aromatic diisocyanate selected from the class consisting of phenylene diisocyanates and 1,5-naphthylene diisocyanate, and further reacting 100 parts by weight of the resulting substantially linear polyesterurethane gum with 4 to 16 parts by weight of additional aromatic diisocyanate.

5. The process of producing a rubbery, polyurethane vulcanizate having a tensile strength of substantially greater than 5,000 pounds per square inch which consists essentially of reacting one mole of a linear hydroxyl polyethylene adipate having a molecular weight of 675 to 1,100, a hydroxyl number of 99 to 165, a hydroxyl content of 3 to 5 percent and an acid number below 2 with 1.02 to 1.08 moles of para-phenylene diisocyanate, said polyester prepared by reacting an excess of ethylene glycol with adipic acid and having a melting point of 40 to 46° C., and further reacting 100 parts by weight of the resulting substantially linear polyesterurethane gum with 6 to 12 parts of additional aromatic diisocyanate.

6. The process of producing a rubbery, polyurethane vulcanizate having a tensile strength of substantially greater than 5,000 pounds per square inch which consists essentially of reacting one mole of linear hydroxyl polyethylene adipate having a molecular weight about 900, a hydroxyl number about 130, a hydroxyl content about 4 percent, less than 0.5% free ethylene glycol and less than 0.5% water and an acid number below 2 with 1.02 to 1.04 moles of para-phenylene diisocyanate, said polyester prepared by reacting an excess of ethylene glycol with adipic acid and having a melting point of 40 to 46° C., and further reacting 100 parts by weight of the substantially linear polyesterurethane gum with 6 to 14 parts by weight of para-phenylene diisocyanate.

7. A rubbery, processable, substantially linear polyesterurethane gum vulcanizable to a tensile strength of greater than 5,000 pounds per square inch which consists essentially of the reaction product of one mole of a linear aliphatic hydroxyl polyester of ethylene glycol and an aliphatic dicarboxylic acid having a molecular weight of 600 to 1,200, a hydroxyl number of 95 to 185, a hydroxyl content of 2.8 to 5.7 percent and an acid number below 2 with 1.02 to no greater than 1.1 moles of an aromatic diisocyanate, selected from the class consisting of phenylene diisocyanates and 1,5-naphthylene diisocyanate.

8. A rubbery, processable, substantially linear polyesterurethane gum vulcanizable to a tensile strength of substantially greater than 5,000 pounds per square inch which consists essentially of the reaction product of one mole of a linear hydroxyl polyethylene adipate having a molecular weight of 675 to 1,100, a hydroxyl number of 99 to 165, a hydroxyl content of 3 to 5 percent and an acid number below 2 with 1.02 to 1.08 moles of para-phenylene diisocyanate, said polyester prepared by reacting an excess of ethylene glycol with adipic acid and having a melting point of 40 to 46° C.

9. A rubbery, processable, substantially linear polyesterurethane gum vulcanizable to a tensile strength of substantially greater than 5,000 pounds per square inch which consists essentially of the reaction product of one mole of linear hydroxyl polyethylene adipate having a molecular weight about 900, a hydroxyl number about 130, a hydroxyl content about 4 percent, less than 0.5% free ethylene glycol and less than 0.5% water and an acid number below 2 with 1.02 to 1.04 moles of para-phenylene diisocyanate, said polyester prepared by reacting an excess of ethylene glycol with adipic acid and having a melting point of 40 to 46° C.

10. A rubbery, polyesterurethane vulcanizate having a tensile strength of greater than 5,000 pounds per square inch which consists essentially of the reaction product of one mole of a linear aliphatic hydroxyl polyester of ethylene glycol and an aliphatic dicarboxylic acid having a molecular weight of 600 to 1,200, a hydroxyl number of 95 to 185, a hydroxyl content of 2.8 to 5.7 percent and an acid number below 2 with 1.02 to no greater than 1.1 moles of an aromatic diisocyanate selected from the class consisting of phenylene diisocyanates and 1,5-naphthylene diisocyanate, and further reacting 100 parts by weight of the resulting substantially linear polyesterurethane gum with 4 to 16 parts by weight of additional aromatic diisocyanate.

11. A rubbery, polyesterurethane vulcanizate having a tensile strength of substantially greater than 5,000 pounds per square inch which consists essentially of the reaction product of one mole of a linear hydroxyl polyethylene adipate having a molecular weight of 675 to 1,100, a hydroxyl number of 99 to 165, a hydroxyl content of 3 to 5 percent and an acid number below 2 with 1.02 to 1.08 moles of para-phenylene diisocyanate, said polyester prepared by reacting an excess of ethylene glycol with adipic acid and having a melting point of 40 to 46° C., and further reacting 100 parts by weight of the resulting substantially linear polyesterurethane gum with 4 to 16 parts of additional aromatic diisocyanate.

12. A rubbery, polyurethane vulcanizate having a tensile strength of substantially greater than 5,000 pounds per square inch which consists essentially of the reaction product of one mole of linear hydroxyl polyethylene adipate having a molecular weight about 900, a hydroxyl number about 130, a hydroxyl content about 4 percent, less than 0.5% free ethylene glycol and less than 0.5% water and an acid number below 2 with 1.02 to 1.04 moles of para-phenylene diisocyanate, said polyester prepared by reacting an excess of ethylene glycol with adipic acid and having a melting point of 40 to 46° C., and further reacting 100 parts by weight of the substantially linear polyesterurethane gum with 6 to 14 parts by weight of aromatic diisocyanate selected from the group consisting of paraphenylene diisocyanate, metaphenylene diisocyanate, biphenyl-4,4'-diisocyanate and 1,5-naphthylene diisocyanate.

References Cited in the file of this patent
UNITED STATES PATENTS

| | | |
|---|---|---|
| 2,620,516 | Muller | Dec. 9, 1952 |
| 2,621,166 | Schmidt et al. | Dec. 9, 1952 |
| 2,625,531 | Seeger | Jan. 13, 1953 |
| 2,625,532 | Seeger | Jan 13, 1953 |
| 2,625,535 | Mastin et al. | Jan. 13, 1953 |

OTHER REFERENCES

Bayer et al.: Rubber Chem. and Techn., October-December 1950, pages 812 to 835.

UNITED STATES PATENT OFFICE
CERTIFICATE OF CORRECTION

Patent No. 2,770,612

November 13, 1956

Charles S. Schollenberger

It is hereby certified that error appears in the printed specification of the above numbered patent requiring correction and that the said Letters Patent should read as corrected below.

Column 4, line 45, for "weight of 1,22," read -- weight of 1,122, --.

Signed and sealed this 19th day of November 1957.

(SEAL)
Attest:

KARL H. AXLINE
Attesting Officer

ROBERT C. WATSON
Commissioner of Patents